United States Patent [19]

Doster et al.

[11] Patent Number: 4,644,468
[45] Date of Patent: Feb. 17, 1987

[54] NAME USAGE SUPPORT THROUGH DISTRIBUTED PROCESSING NETWORKS LINKED BY BRIDGES AND/OR GATEWAYS

[75] Inventors: William A. Doster, Bellevue, Wash.; Robert Sachsenmaier, Boca Raton, Fla.

[73] Assignee: International Business Machines Corp., Armonk, N.Y.

[21] Appl. No.: 631,567

[22] Filed: Jul. 20, 1984

[51] Int. Cl.$^4$ .............................................. G06F 15/16
[52] U.S. Cl. .................................................. 364/200
[58] Field of Search ... 364/200 MS File, 900 MS File

[56] References Cited

U.S. PATENT DOCUMENTS

4,396,983 8/1983 Segarra et al. ...................... 364/200

Primary Examiner—Raulfe B. Zache
Attorney, Agent, or Firm—Robert Lieber

[57] ABSTRACT

For facilitating data communication between entities in a local area network (storage files, programs, devices, human operators, etc.), a method is disclosed for addressing such communications to logical names adopted for the entities; rather than to discrete physical locations in the network. The subject method allows for extension of name-directed communications across bridges (between separate communication media or between discrete frequency channels on one medium). Extensions of such communications across bridges are conditioned on the handling of respective communications within the channel or medium leading to respective bridges. If a named entity is reachable within a channel or medium leading to a bridge, the communication will be acknowledged by the processing facility at the node serving that entity, and the communication will not be extended. With the present method, a program running on a processor at one node of the network may call for retrieval of a data set by name, where the location of the data set need not be known or specifiable by either the program or the processor and the respective data set may be retrieved through a process of communication which is entirely transparent to the program and processor, and also not ambiguous or burdensome when the network path to the named data set contains bridges and/or gateways.

16 Claims, 8 Drawing Figures

(NAME CHECK, CALL NAME CHECK)

FIG. 4

(BRIDGE DATAGRAM)

BRIDGE TABLE

|  | NODES (SIDE 1) @ | | @ NODES (SIDE 2) | |
|---|---|---|---|---|
|  | Ai |  | Aj |  |
| * TYPE | B |  | NB |  |
| # DELAY FACTOR | X |  | D2 |  |
| TIMER VALUE | T1 |  | T2 |  |
| HOP COUNT | -- |  | H2 |  |
| SEQ. NO. | -- |  | -- |  |
| FRAME ID | -- |  | -- |  |
| u STATE (I/U) | -- |  |  |  |

* ENTRIES B/NB IN THIS ROW REPRESENT BRIDGING/NON-BRIDGING

\# ENTRIES X REPRESENT "DON'T CARE"

u ENTRIES I/U REPRESENT INITIATED/UNINITIATED NODE STATES

@ THE TABLE MAY HAVE MORE THAN ONE ENTRY PER NODE; FOR HANDLING PLURAL CO-ACTIVE NAME CHECKING TYPE REQUESTS

NAME USAGE SUPPORT THROUGH DISTRIBUTED PROCESSING NETWORKS LINKED BY BRIDGES AND/OR GATEWAYS

CROSS-REFERENCE TO RELATED PATENT APPLICATIONS

Disclosures in the following co-pending patent applications are incorporated herein by the present reference:

Application Ser. No. 604,684, by B. Feigenbaum et al., filed May 3, 1984, and entitled "Distributed Control of Alias Name Usage in Networks", discloses a system for enabling processing entities at separate nodes of a network to create name associations without intermediate translations of name parameters into physical address parameters through a centrally maintained directory facility or the like. It also discloses a method for establishing sessions between named entities without intermediate translations between name and physical address parameters. The present invention enhances and improves the communications associated with name and session creation as described in this reference; accomplishing such by causing communications through single media or channels to be handled discretely separate from corresponding communications between bridged media and channels.

Application Ser. No. 631,566, by B. Feigenbaum et al., filed July 20, 1984, and entitled "Non-Unique Names For Broadcast Messages", discloses a method for establishing non-unique names in such networks, and a method for using such non-unique names as controlling parameters for transferring communications from any entity in a network to a selected group of remote entities identified by the respective name. The present invention makes specific use of this non-unique name function for selectively transferring communications across bridging/gateway elements in the network.

BACKGROUND OF THE INVENTION

This invention relates to a method for causing "name directed" communications in a data communication network to be transferred selectively across bridging and/or gateway elements which respectively link separate communication channels and/or media within the network. As just used, the term "name directed" is intended to refer to communications which are directed to logical names rather than to specific locations (addresses) in the network. Such names are associatable with a variety of entities within the network, including physical objects (computers, their I/O attachments, human operators, network access adaptors, etc.) and less tangible objects such as programs and data sets. For reasons which will become apparent as this description progresses, this invention operates most effectively in local area type network environments.

In such environments, data processing entities located at various network nodes (a node being defined herein as a point of coupling to a communication medium or channel) may operate in a distributed mode to establish unique and non-unique name associations for entities served through respective nodes, and also to establish communication sessions (i.e. logical connections) between respectively served entities, without requiring intermediate translations of related communications through shared processing entities containing directory tables relating all names to physical address locations (refer to the above cross-referenced patent applications). Such "related communications", as disclosed in the referenced applications, are termed Name Check and Call Name Check messages, and are respectively used for enabling the processing system at an originating node to determine: (a) if adoption of a name would conflict with uses of the same name elsewhere in the network; and (b) if a called object of a communication session is reachable in the network by a name and distinguishable unambiguously from other entities. These messages are passed from originating nodes to network media and/or channels, and examined by processing equipment at all respectively linked nodes. Each examining node performs a lookup comparison between a name in the message and names in a local Name Table (the latter representing names adopted for locally attached entities), and returns an acknowledging message if a match is encountered. The acknowledgements are used by the originating equipment to determine the action to take with respect to related name adoption and session establishment processes (complete or abort).

The present invention concerns a method for selectively controlling the handling of such name checking communications, and related acknowledgements, across bridging/gateway boundaries within the network. In the absence of present controls, the originating equipment would be responsible for defining hop count parameters restricting the passage across such boundaries (in order to avoid the possibility of having such communications circulate redundantly through "loops" formed by sequentially linked media/channels), and this would require considerable storage of information associated with network topology at all network nodes. Furthermore, the present restrictions permit networks to be dynamically expanded, by joinder of sub-networks associated with separate media/channels through added bridges, without inconveniencing users by requiring reestablishment of name associations and yet avoiding problems which would otherwise be encountered where the same name is used on a unique basis in plural sub-networks.

In the above-mentioned "preferred" local network environment, equipment at any network node may use a "datagram" type message to distribute information restrictively to a select group of entities identified by a name contained in the message. Such messages differ from universally broadcast messages in that they require attention only at nodes serving the members of the named entity group (refer to the above-referenced "Non-Unique Names" patent application by Feigenbaum et al.). The present invention makes special use of such datagram type messages for controlling handling of name creation and session establishment communications across bridges and gateways linking sub-networks formed by equipment coupled to single media or channels (such sub-networks also being referred to herein as "primitive networks", and distinguished thereby from "complex networks" characterized as networks formed by linkage of two or more primitive networks).

One difficulty with managing the use of distributively created names in such networks is that as primitive networks are joined into larger complex networks, name associations adopted before the joinder may become ambiguous. Although this could be avoided by requiring cancellation and recreation of all name associations at joinder, this could be unwieldy or impractical in networks containing thousands of entities and name associations.

Another problem is that joinder of primitive networks gives rise to the possibility of linking three or more media and/or channels serially to form redundant circulation loops. It is possible to avoid redundant circulation of name-directed communications in such loops, by requiring the originator of each such communication to add to its message a "hop count" parameter limiting the number of bridges/gateways through which that communication can pass. However, this would require equipment at every network node to be able to store information effectively defining the entire topology of the network (which would be a heavy storage burden for such equipment), and such information would have to be changed with each physical change of the network configuration (a sizable communication burden).

SUMMARY OF THE INVENTION

The present invention provides an efficient method of avoiding the foregoing problems, relative to the use of logical name-directed communications in changeable complex networks. This method involves partitioning each name-directed communication into several discrete communication processes. In a first process, the information to be communicated is broadcast over the primitive network immediately linked to the originating node. This broadcast is presented in a first format designed to cause facilities at bridging nodes (in the present specification, the term "bridging" will be used to characterize both bridges and gateways) of the same primitive network to ignore it (i.e. not pass its information to other network media). If this broadcast is not acknowledged, the information is transmitted in a second form—preferably a datagram directed to the group "bridges"—and then rebroadcast from bridges to other network media in the first form. If the rebroadcast is not acknowledged, the respective bridging facility may send another datagram to further bridges continuing the process out over the network. The range of continuation (i.e., the hop count) is determined at each bridging facility having a primitive link to the node originating the name checking request.

More specifically, in accordance with the present invention, a node seeking to adopt a name association or to establish a session with an entity designated by name, respectively broadcasts a Name Check or a Call Name Check message to the primitive network to which it is directly linked. Thereafter, it monitors the respective medium or channel for ackowledgements. Bridging facilities ignore this message (by convention). The monitoring action by the originating node is limited in time to a predetermined "primitive timeout" interval related to the length of the primitive network. If the message is not acknowleged during that interval, the originator may repeat this broadcast and monitoring operation one or more times, up to a predetermined "retry limit", spacing successive operations at predetermined timeout intervals. If all tries are unacknowledged, the originator encapsulates the same information in a "datagram" type communication directed by the name "bridge" to all bridging facilities directly linked to the same medium or channel. The originator then times out for a second predetermined interval, allowing for delayed handling and acknowledgement in networks linked through the bridging facilities.

In response to this datagram, processing equipment at each bridging node reformats the datagram information into the original Name Check or Call Name Check form, and rebroadcasts the information in its original form over the further medium or channel spanned through that node. The bridge processing equipment then times out for a predetermined interval of time allowing for acknowledgements from nodes linked to the respective spanned medium or channel. If an acknowledgement is received, it is returned to the originating node via the medium directly coupled to that node. If more than one acknowledgement is received at the bridge, the bridge processing facility may pass the first one and suppress others; thereafter taking actions transparent to the originating node with respect to correcting conflicts. The re-broadcasting and timeout operations may be retried at the bridge, up to a predetermined retry limit. If no acknowledgements are received, the bridging facility may repeat its prior action, up to a retry limit; i.e., re-transmit the Name Check or Call Name Check, recognize acknowledgements, and pass the first acknowledgement towards the origin node. A bridge transmitting the information in the first (original) form, and receiving no acknowledgement after all retries, decrements the hop count and if its value is not "0" sends another datagram containing the decremented count to a further medium/channel.

In the foregoing processes, the bridging facilities may take either active or passive roles with respect to handling acknowledgements. In the passive mode, all acknowledgements are directly forwarded to the originating node in point-to-point (addressed) communications, whereas in the passive mode, only a first acknowledgement is forwarded, and the bridge facility assumes responsibility for dealing with additional responses representing conflicting or ambiguous network conditions.

A feature of the foregoing process is that bridging facilities which are linked to an originating node in a "primitive network" (i.e., through a single medium or channel) determine the transfer range (hop count limit) of bridge type datagrams, and since the number of bridging nodes in any network will generally be much less than the total number of communicating nodes, the amount of process handling and storage requirements relating to such determinations will be considerably less than would be required if each originating node had to set the hop count.

Another feature is that this process eliminates any need for users of the network (including software running at nodes, and freeman operators interacting at nodes) to specify destination paths for their name checking communications, and this simplifies the communication process.

These and other aspects, features, advantages and benefits of the present invention may be more fully understood and appreciated by considering the following description and claims.

DETAILED DESCRIPTION OF PREFERRED EMBODIMENTS

Table of Contents

1. Introduction
2. Statement of Problem
3. Present Solution (Overview)
4. Formats (Name Check, Call Name Check, Bridge Datagram
5. Name Check and Call Name Check Handling
6. Bridge Datagram Handling
7. Setting of Node Timeouts
8. Conclusion

1. INTRODUCTION

Figure 1:
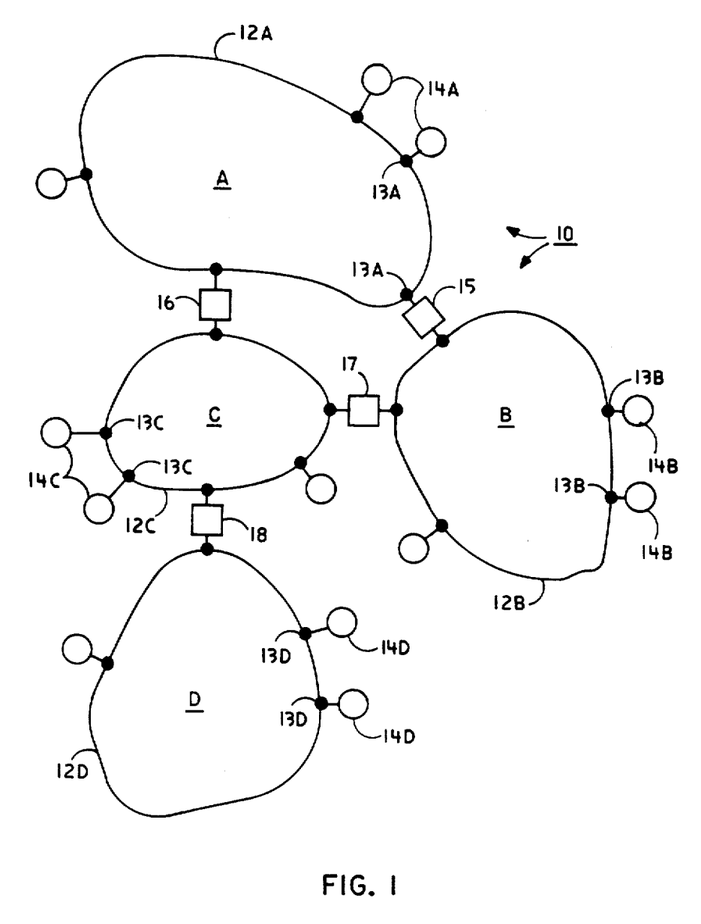
FIG. 1 illustrates a typical complex network configuration representing the environment in which the present invention will be used.

Referring to FIG. 1, primitive networks A-D are linked into a complex network 10 by bridging facilities discussed below (refer to the definitions of "primitive" and "complex" given previously). Each primitive network contains a respective medium/channel 12A, 12B, 12C, 12D having respective nodes or taps 13A, 13B, 13C, 13D, such nodes serving respective communication and data processing facilities 14A, 14B, 14C, 14D. Bridging facilities shown at 15-18 link the media 12A-12D to form the complex configuration. Such bridging facilities may couple to respective media through nodes either physically separate from the nodes 13A-13D or they may reside physically within any of the facilities 14A-14D and share respective nodes. Each primitive network may serve multiple processing facilities or stations 14 through nodes 13 of the respective medium/channel.

Bridging facilities of the type represented at 15-18, but without the adaptations to be described presently for handling name-directed communications, are well known in the art. Such facilities are described, for example, in U.S. Pat. Nos. 4,287,592 (granted Sept. 1, 1981 to Paulish et al.) and 4,365,331 (granted Dec. 21, 1982 to Biba et al.). To the extent that these descriptions may be relevant to the present disclosure, they are incorporated herein by this reference. In general, such facilities are connected to two media or two channels (time or frequency divisions) of one medium, and they operate to pass information bearing signals bidirectionally between associated media/channels. These facilities may include programmed microprocessors and storage units permitting them to perform sophisticated buffering and format translation operations on information signals in transit between linked media/channels. In the configuration exemplified in FIG. 1, bridge facility 15 links media/channels 12A and 12B, bridge 16 links media/channels 12A and 12C, bridge 17 links media/channels 12B and 12C, and bridge 18 links media/channels 12C and 12D.

The foregoing processing facilities (14A-14D) operate through respective network nodes (13A-13D), in the manner described in the cross-referenced co-pending patent applications, to adopt logical (alias) names for respective entitles (operators, programs, data sets, etc., served at the respective node sites). These names are characterized as logical because they need have no direct associations with physical locations of respective entities. The adoption procedure is characterized by communications over the network which do not require any intermediate handling to translate logical names into address parameters representing specific nodes or sites in the network.

In general, and ignoring the handling across bridges to be described later, such communications involve broadcast transmission of a Name Check message from the facility seeking to adopt a name, and monitoring of the message by the other facilities. Each facility 14A-14D maintains Name Tables defining name associations adopted at the respective facility, and each facility may act independently of the others to initiate a communication process for adoption of a new name association. The initiating facility broadcasts a Name Check message, as mentioned above, which contains the name which that facility proposes to adopt. Other facilities monitor the message, compare the message name to names in respective name tables, and return an acknowledging communication if a match is found. If no match is found, the monitoring facility ignores the Name Check.

If a processor originating a Name Check receives one or more acknowledgements, and if the name sought to be adopted is intended to be used on a unique basis in the network (see the "Non-Unique Name" referenced application), the originating processor recognizes a name conflict, rejects the name and ends the adoption process. If no acknowledgement is received, the name may be adopted (entered into the processor's Name Table).

A similar process pertains to session establishment. If, for instance, a program P, running on a processing facility at one node, requires access to a data set known by a particular name, the processing facility at the node executing P broadcasts a Call Name Check message directed to the needed data set by name. This message contains the logical names of the calling and called entities (in this case P and the name of the needed data set). Processing facilities receiving this message check respective Name Tables, and return an acknowledging message if and only if an entry matching the called name is found. If the originating node receives no acknowledgements, it aborts the session call process. But if it receives an acknowledgement it continues the process with other communications until a session is established (see the "Distributed Control" referenced patent application). Thus, the node serving P could retrieve the data set by name; i.e. without any prior information as to the physical location of the data set in the network (and therefore transparent to all program processes running on the node processors serving P and the required data set.

2. STATEMENT OF THE PROBLEM

Figure 2:
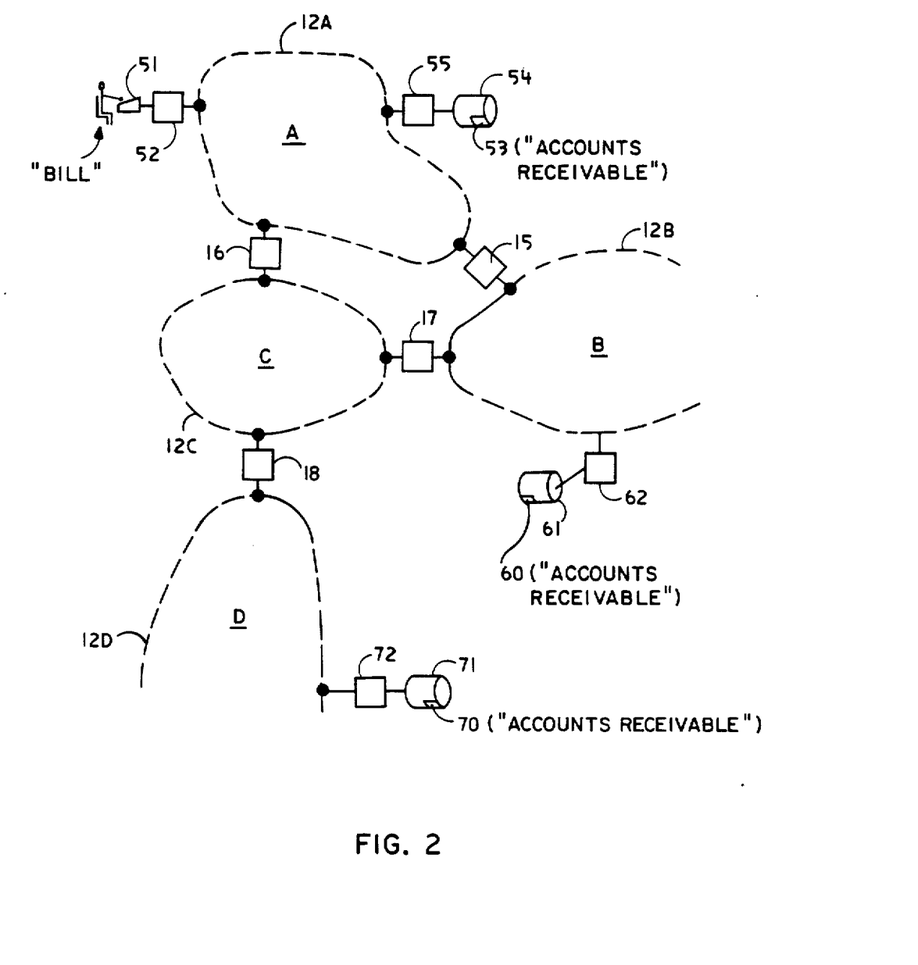
FIG. 2 illustrates problems in such networks which are intended to be avoided by means of the present invention.

Now suppose that in the complex network environment exemplified in FIG. 1, the name assigned to a data set which is the object of a session call is used conflictingly in several primitive networks. This could occur, for instance, if previously isolated primitive networks were joined to form a complex configuration, and several of the joined networks contained nodes using the above-mentioned data set name. This situation, and the problems it could present, are illustrated in FIG. 2.

Operator "Bill", acting through keyboard/display terminal 51 and software running on processing facility 52 (application program, etc.) may require access to a data set "accounts receivable". Now assume that processor 52 is linked to network A as shown, and that the data set required by Bill's application is stored at 53 on a disk file 54 served by a processor 55 linked to network A. But assume also that other non-pertinent data sets named "accounts receivable" are being maintained on networks B and D; the one on network B stored at 60 on a disk file 61 accessible through processing facility 62, and the one on network D stored at 70 on disk file 71 accessible through processing facility 72.

Now assume that when Bill's application program calls for "accounts receivable", facility 52 checks its Name Table, determines that the required data set is not attached locally, and broadcasts a Call Name Check over medium 12A indicating "Bill" as the calling entity and "accounts receivable" as the called entity. If this message could be transferred through bridges without restriction, and monitored at nodes of all media 12A–12D, several problems occur. First, acknowledgements would be returned by facilities 55, 62 and 72 which to facility 52 could appear conflicting. Second, the Call Name Check message could circulate repeatedly through the loop formed by medium 12A, bridge 16, medium 12C, bridge 17, medium 12B, and bridge 15, and also through the loop formed by medium 12A, bridge 15, medium 12B, bridge 17, medium 12C and bridge 16.

This situation would not have arisen if each facility such as 52 could restrict the number of bridges allowed to be crossed by its Call Name Check (and Name Check) communications (e.g. by specifying a limiting "hop count" value of 1; see the cross-referenced "Distributed Control" application), or if the network were structured to prevent conflicting name adoptions. However, these solutions present other problems. Requiring the originating facility to specify a hop count value imposes a burden on all processing facilities of maintaining information relative to network topology sufficient to ensure that loops formed by bridges are not fully traversed. But a network such as 10 may serve many processing facilities, and it may be changing dynamically as new primitive networks are added, so that maintenance of suitable topology information at each facility would be quite difficult. On the other hand, structuring the network to prevent conflicting name adoption would require re-creation of all name associations after each network change; which also would not be practical.

3. THE PRESENT SOLUTION (OVERVIEW)

The present invention provides a simpler solution, by organizing the processing facilities such as 52 to transmit their Name Check and Call Name Check communications in a series of discrete operations fanning out progressively through media and bridges further removed from the originating node. The fanning out process is transparent to the originating node, and requires the processing facilities at the bridges to bear the burden of determining "hop count" ranges for such communications. However, since such networks have far fewer bridging facilities than general purpose processing facilities, this tends to considerably lessen the processing burdens imposed on the non-bridging nodes, as well as considerably reduce the related volumes of network traffic, in comparison to requiring all nodes to determine respective hop count restrictions.

The technique used presently for controlling the foregoing fanout process involves transmission of Name Check and Call Name Check information in different first and second forms. These forms and the processes involved in their handling will be discussed at length later. For the present overview, it is observed that in the first form the information is arranged as a broadcast message which has a range of one primitive network medium or channel (i.e. cannot pass across bridges), and in the second form, the information is encapsulated in a "datagram" (see the cross-referenced "Non-Unique Name" application) directed exclusively to bridges which are directly linked to the primitive medium.

Upon originating a Name Check or Call Name Check communication in the first form, the processing facility at the respective origin node times out for a predetermined first time period allowing for acknowledgements to return from nodes within the "primitive" range of that communication. If no acknowledgements are received, this communication and timeout procedure may be repeated one or more times, up to a predetermined retry limit.

This type of repetition is generally desirable, because these name checking requests are transmitted in a broadcast mode. Therefore, an error in the transmission or reception of the associated signals could cause the receiving processor to mis-interpret and mis-handle the request (for instance, an error in transfer of the message type information or the name to be checked could cause a node having a potential name match to ignore the message).

If one or more acknowledgements are received, the action taken by the originating facility depends on the related communication process (name adoption or session establishment). If the process is for name adoption, and if the proposed name is intended for use on a unique basis, receipt of acknowledgement represents a conflict, and the name is rejected. If the process is for session establishment, acknowledgement represents confirmation of the existence of the called entity within the directly linked primitive network, and the process is continued with other communications, over the same primitive network, which are not relevant to the present invention (see the "Distributed Control" reference).

If a processing facility originating a Name Check or Call Name Check broadcast (first form) communication receives no acknowledgement (after all repetitions if the first form broadcast is repeated up to a retry limit), it sends the same information out over its primitive net medium in the second form. In this form, the information is encapsulated in a datagram directed to the name "bridge", and is given special interpretive handling at each bridge facility linked to the originating facility through a primitive net. In such handling, each bridge extracts the information constituting the original Name Check or Call Name Check broadcast and re-broadcasts that information in its original (first) form. The bridge processing facility then times out for a predetermined time period allowing for acknowledgement by nodes linked to the bridged medium.

If a bridge which has re-broadcast a Name Check or Call Name Check receives one or more acknowledgements, it forwards the first acknowledgment to the originating node (via the medium/channel linked to that node). If more than one acknowledgement is received, and if that represents a network conflict, the bridge processor determines the nature of the conflict and issues a communication over the bridged medium remote from the originating node, informing acknowledging nodes of the conflict. If no acknowledgements are received, the action taken by the bridge facility depends on its hop count distance from the originating node (a bridge directly linked to the originating node via a common medium or channel is at a hop count distance of 0, and bridges linked through additional media or channels are at higher valued hop count distances directly corresponding to the number of intervening additional media or channels).

A bridge at hop count 1 distance, which receives no acknowledgement of the foregoing re-broadcast, consults a local table of network topology, and if the medium or channel to which it links is not coupled to a further bridge (one "further removed" from the originating node) the bridge terminates its handling of the respective Name Check or Call Name Check communication. If a bridge at 0 hop count distance receives no acknowledgement, and is capable of reaching a further bridge without looping (i.e. without passing through another bridge at 0 hop count distance from the origin node), it forms a second datagram containing a hop count value related to the number of further bridges which can be successively reached from this bridge without looping.

Each bridge receiving the above-mentioned second datagram decrements the hop count and repeats the process performed by the proceding bridge relative to a respective further removed medium or channel (i.e., re-broadcasting the Name Check or Call Name Check; timing out for acknowledgements, relaying the first acknowledgement if one is received, and if none is received, either extending the process to the next level of bridging, if the hop count value is not 0, or concluding the process).

At any level of bridge handling, termination of an extended and unacknowledged communication handling process requires no further communication back to the originating node. The absence of such acknowledgement is effectively inferred by the originating node due to a timeout process conducted at that node. The latter timeout is established in accordance with a "process timout" parameter determined by inter-action between the non-bridging and bridging nodes when any non-bridging node is first activated on the network.

Before a newly activated non-bridging node can enable itself for name adoption or session establishment communications (i.e. Name Check or Call Name Check broadcasts), it is required (by protocol) to send an initial datagram addressed to "bridges" and containing a request for timeout initialization. The processing facilities at bridges distinguish such initial requests from datagrams containing encapsulated Name Check or Call Name Check functions by checking local tables and recognizing that the origin node is in an uninitiated state (see "Setting Of Node Timeouts" infra). The local table at each bridge receiving this request datagram (i.e. each bridge at hop count distance 0 from the requesting node) contains information related to the topology of the network on either side of the bridge, which is stored when the network is either initialized or reconfigured. In response to an initialization request, the bridge processor consults its table, and extracts a process delay factor which is sent back to the node requesting initialization in a response message.

This delay factor is just larger than the projected "worst case" delay in signal propagation and information handling between the request originator and the most distant node accessible through the respective bridge without passing through a further bridge forming a looping path back to the originator. The processing facility at the node requesting initialization examines the returned delay factors and selects the largest value as its "process timeout" function. In subsequent name adoption and session establishment operations, the respective facility uses this function to set a time limit for receiving acknowledgements. Thus, if any bridge completes its handling of a respective Name Check or Call Name Check operation without receiving an acknowledgement, and thereby terminates its handling of the operation, the termination will fall within the timeout set at the originating node and effectively dealt with as an absence of acknowledgement.

Each node is also initialized with a "primitive timeout" function, for timing its Name Check and Call Name Check operations relative to its primitive network. This function is related to the longest propagation and processing delay normally anticipated within the respective primitive network. A node originating a Name Check or Call Name Check, and receiving no acknowledgement within the interval measured by its primitive timout factor, effectively may infer that that communication will not be acknowledged, and proceed accordingly with the next appropriate action (retry the communication, send bridge datagram, etc.)

4. FORMATS (NAME CHECK, CALL NAME CHECK, BRIDGE DATAGRAM)

Figure 3:
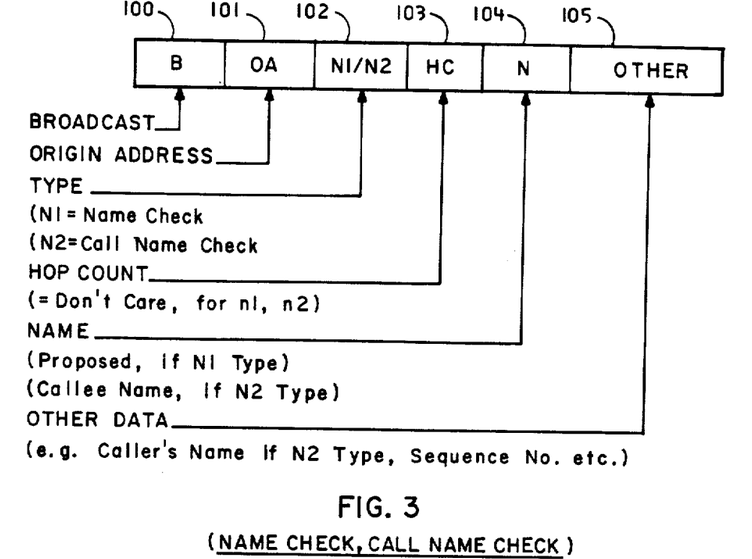
FIG. 3 illustrates formats of Name Check and Call Name Check messages used respectively for name adoption and session establishment operations at nodes of the typical network shown in FIG. 1.
Figure 4:
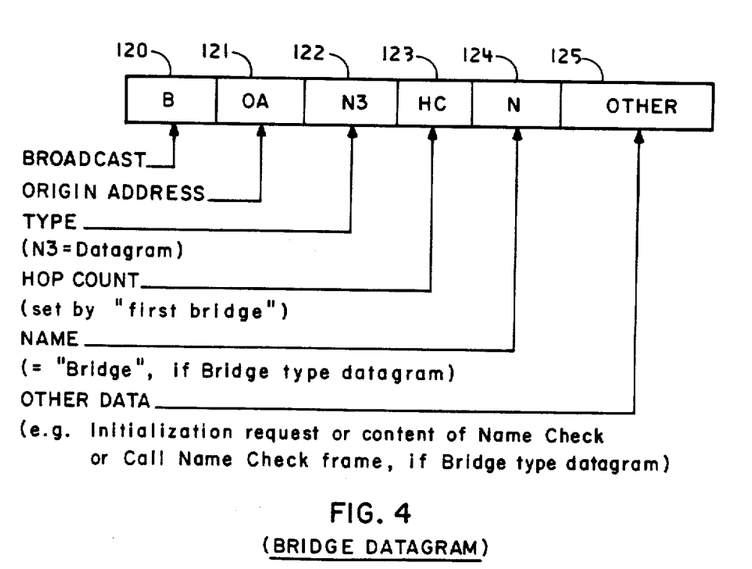
FIG. 4 illustrates the form of "bridge" datagrams used in accordance with the present invention for restrictively transferring Name Check and Call Name Check communications between bridged media/channels in the exemplary environment.

FIGS. 3 and 4 illustrate formats of presently relevant Name Check, Call Name Check and datagram communication functions. Name Check and Call Name Check have control fields 100–105 which include destination field 100, origin address field 101, type field 102, hop count field 103, name field 104 and other information 105. The value in the type field distinguishes between Name Check and Call Name Check functions (N1 for Name Check; N2 for Call Name Check). The value in the destination field indicates a broadcast destination for both types of functions (or it may be treated as a "don't care" value if the type field values N1 and N2 are taken to imply broadcast handling). As broadcast type communications, these functions require special treatment, since traditional broadcast type functions are usually not acknowledged and these functions require conditional acknowledgement (if the name field 104 matches a name in the receiving node's Name Table). The origin address 101 is the address of the node originating the communication. It is used as the destination address in not-shown acknowledgements (see cross-referenced "Distributed Control" application for information on acknowledgement formats). The name field contains either a name proposed for adoption, if the communication is a Name Check, or the name of an entity which is the object of a session call if the communication is a Call Name Check.

The rest of the information, field 105, depends on the communication type. For Call Name Check, this includes the caller's name (the entity for which the session is being called), and for both types N1 and N2 it includes various numbers permitting acknowledgers to identify the communication and the matched name with abbreviated codes (as in any contemporary communication system, it is expected that each node may issue a number of communications of this nature with overlapping timeouts; thus, it is important to be able to identify individual communications and their names, and being able to do so with abbreviated codes is obviously efficient.

Datagram type communications contain control fields 120-125 which direct their handling at receiving nodes. The type (N3) distinguishes datagrams (see the "Non-Unique" application previously referenced) from other forms of communication. The destination is indicated as "broadcast", but the accompanying "other" information is processed only at nodes which have Name Table matches for the "non-unique" datagram name (which, for datagrams presently of interest, would be "bridge" or a name having similar meaning of association with bridging nodes). The origin address is the address of the node originating the datagram transmission. The other information in the "bridge" type datagram includes either a request for initialization sent by a non-bridging node or the content of a previously unacknowledged Name Check or Call Name Check communication.

The values set in hop count fields 103 and 123 depend on the nature of the communication and its origin. Field 103 is either to be ignored (treated as "don't care" condition) or set to a 0 value if the respective Name Check/Call Name Check originates at a non-briding node. If the respective Name Check or Call Name Check originates at a bridging node, field 123 is always set to 0. Field 123 is set to 0 if the datagram originates at a non-bridging node. If the datagram is one issued from a bridging node, its value will depend on the position of the respective node in the network path through which the respective information is being handled. If the node is the first bridge in the handling path, the value set will be one selected by that bridge. If the datagram is issued by a bridge other than a first bridge, the value in field 123 will depend on the number of preceding bridges which have handled the same information (i.e., the value is decremented by the first bridge and each subsequent bridge).

5. NAME CHECK AND CALL NAME CHECK HANDLING

In the preferred environmental system, each node includes a processing facility (e.g., an IBM Personal Computer and supporting microprocessing equipment) for performing general purpose data processing operations, and signalling operations relative to local area networks; e.g., networks of the type described in the referenced U.S. Pat. No. 4,365,331 to Biba et al. Such facilities operate under the direction of supervisory and application programs of presently well known form to perform such operations. When a node's processing facility arrives at a stage of a task or process where it requires a name-related operation presently of interest [either adoption of a name for a locally served entity, or initiation of a session (i.e., logical connection) between a locally served entity and another entity known only by a logical name], it performs the name checking process which is described next with reference to FIGS. 5-7.

Figure 5:
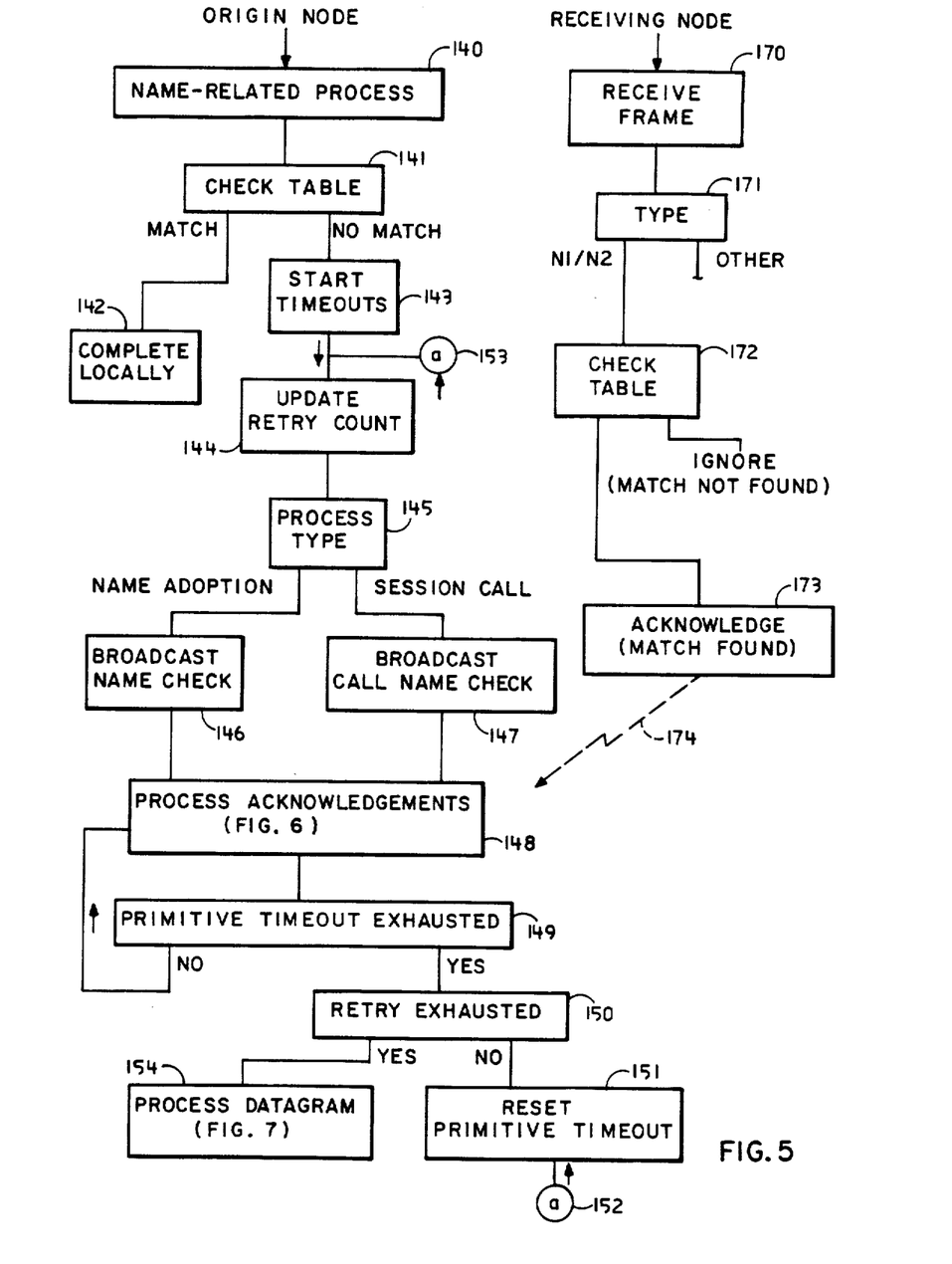
FIGS. 5-7 illustrate, by means of sequence flow diagrams, the handling of Name Check, Call Name Check and Datagram type communications in accordance with the present invention.
Figure 6:
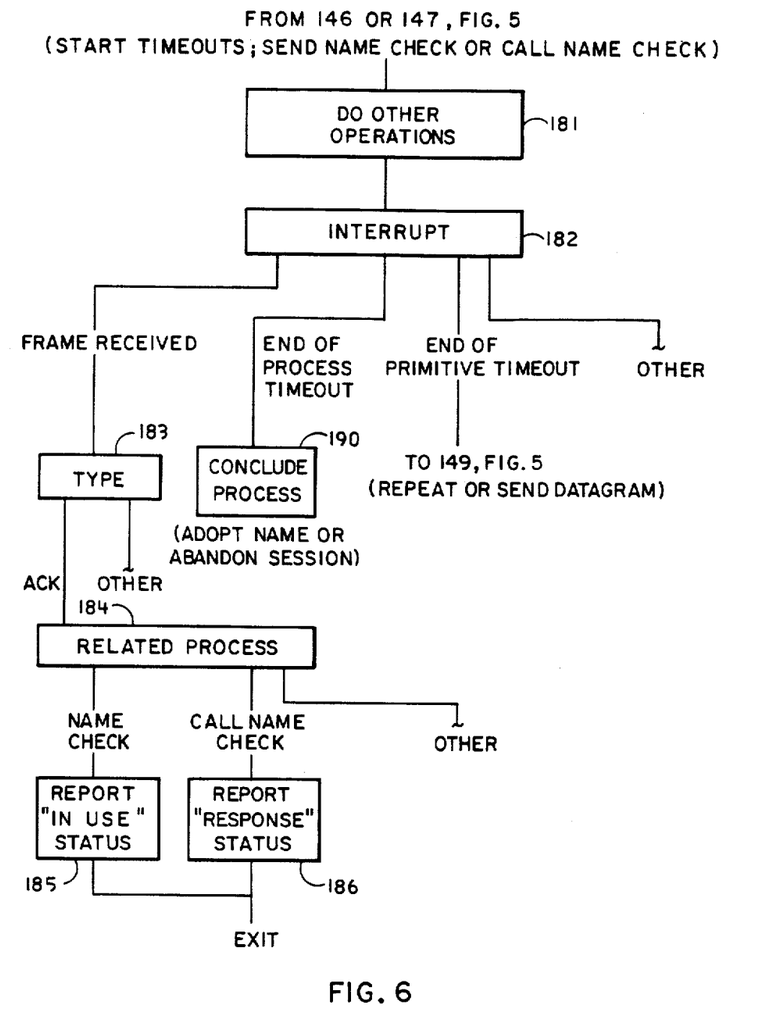
Figure 7:
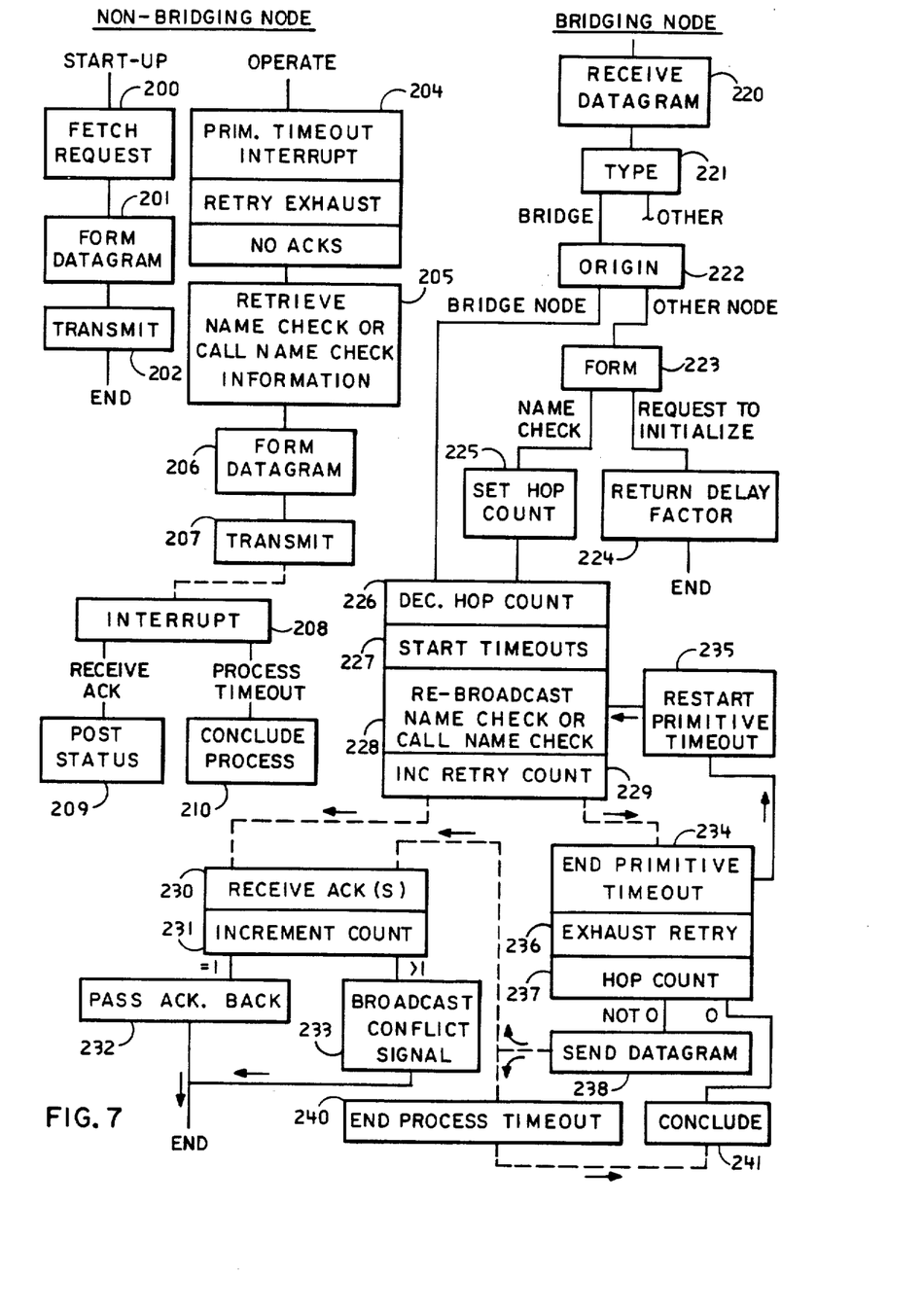

FIG. 5 describes the process of name checking communication generally. FIG. 6 details parts of the process of FIG. 5 relating to handling of timeout and acknowledgements at the node originating a name checking communication. FIG. 7 details the handling of datagram communications at various network nodes in the present environment.

This process, which may require plural discrete stages of data handling and signal communication, is used to check if the object entity name (i.e., the name proposed for adoption, or the name which represents the object of a sesssion call), has conflicting or ambiguous usage in the network; i.e., if a name proposed for adoption is assigned to another entity, or if the object of a session call can be contacted by the Call Name Check name. On determining that its current task requires name usage (step 140, FIG. 5), the processing facility checks a local name table (141, FIG. 5; also refer to the "Distributed Control" application previously referenced for the format of such tables). If the name to be checked matches a local entry, the process is concluded locally (stage 142, FIG. 5).

In the case of proposed name adoption, a match at this stage represents prior usage for another locally served entity, and the process concludes with posting of "in use" status to the program requesting the adoption (which then aborts or discontinues the name use process if such use requires exclusive association with a single entity) adoption process. In respect to session establishment, a local match at this stage indicates that both entities (the called and calling entities) are accessible locally (i.e., without signal communication through the network), and the process is carried forward to conclusion locally (i.e., the session is established or the process is aborted, depending on other local conditions not presently relevant).

If the name being checked does not match a local table entry, the process for broadcasting a Name Check or Call Name Check signal over the directly accessible primitive network is started. The previously mentioned primitive and process timeouts are started (stage 143, FIG. 5), and the retry count is updated (stage 144, FIG. 5); in this instance, set to an initial value representing the first try. The next action is conditioned on the process type (stage 145, FIG. 5). For name adoption, a Name Check message (FIG. 3) is prepared, and when the network becomes available (the method of access to the network medium is not relevant presently), corresponding signals are broadcast over the locally accessible medium (or channel) which forms the primitive network directly linked to the respective node (stage 146, FIG. 5). If the process is to establish a session, a Call Name Check message is prepared, and corresponding signals are broadcast over the local medium (stage 147, FIG. 5).

After either of the foregoing operations, the local processor is released to perform other functions, but remains accessible, through interruption, for handling information arriving through the network, including acknowledgements of its Name Check or Call Name Check signals (148, FIG. 5 and FIG. 6 to be discussed later). When the primitive timeout concludes, the originating facility conditions its next action on the state of the retry count (150, FIG. 5). The presently preferred practice is to take the retry action only if the system has received no acknowledgement of its last name checking signal. However, it would not be considered inconsistent with the present invention to conditionally retry the primitive network communications (up to the retry limit) even if previous communications have been acknowledged.

If the retry limit has not been reached, the primitive timeout is restarted (151, FIG. 5), and actions 144-149 are repeated via recursion path 152, 153 (circled "a"). If the associated broadcast communication is acknowledged, the process is concluded in a manner described later with reference to FIG. 6. If the broadcast communication is unacknowledged when the retry limit is exhausted, a datagram is prepared (154, FIG. 5) and corresponding signals are sent to bridges, for extemdomg the name checking process across bridges in the respective primitive network. Specifics of datagram processing are given later in the discussion of FIG. 7.

The right side of FIG. 5 indicates the operations performed at nodes within the primitive network in response to the signals broadcast at step 146 or step 147. On receiving and buffering these signals (170, FIG. 5), the node processing facility distinguishes between name checking requests and other functions not presently relevant (171, FIG. 5). If a name checking request has been received, the respective name is compared with entires in the local Name Table (172, FIG. 5), If the comparison fails (no matches), the communication is ignored, but if a match is found the node transmits an acknowledging signal (173, FIG. 5). As suggested at 174, the acknowledging signal is directed specifically to the node which requested the check (using the origin address 101, FIG. 3, contained in the request).

The handling of Name Check and Call Name Check acknowledgements at the request origin is shown in FIG. 6. After starting the (primitive and process) timeouts, and sending the associated Name Check or Call Name Check request, the originating processing system is released to perform other operations (181, FIG. 6). While performing such other operations, the processor may be interrupted (182, FIG. 6) to attend to unscheduled events, including presently relevant events such as ending of a timeout related to a communicated request or reception of a request acknowledgement.

If an interruption is caused by an incoming communication, the communication type is distinguished (183, FIG. 6). If it is an acknowledgement of a pending Name Check or Call Name Check request the acknowledgement is associated to the related software process (184, FIG. 6), via the sequence information contained in both the original request and the acknowledgement, and corresponding status information is passed to that process (185 or 186, FIG. 6).

If the related process concerns name adoption, the reported status 185 indicates existing use of the subject name at another network node identified in the acknowledgement and the adoption is discontinued (see the "Distributed Control" reference). If the related process concerns session establishment, the reported status 186 indicates existence and location of the called entity (permitting other communications for completing the session establishment function to be carried out on a point-to-point basis). The handling of acknowledgements relating to communications other than name checking requests is not relevant to the present discussion, and therefore is not shown in FIG. 6. The handling of plural acknowledgements of a single name checking request is explained later in the discussion of datagram handling.

If the previously mentioned interruption was caused by expiration of one of the presently relevant timeouts, the action taken in the interruption process depends on the specific timeout. If the primitive timeout has concluded without an acknowledgement, and the retry limit has not been reached (149, 150 FIG. 5), the processor restarts the primitive the timeout (151, FIG. 5) and repeats the request transmission and acknowledgement monitoring process (144-148, FIG. 5; 183-186, FIG. 6). If the primitive timeout ends and the retry limit is reached, processor initiates process 154 (FIG. 5) for sending a bridge datagram containing the associated Name Check or Call Name Check request, and thereby extending the name checking process across bridges linked to the requesting processor's primitive network. This extension process is discussed below in reference to FIG. 7.

If the interruption was caused by expiration of the process timeout function without acknowledgement, the processor concludes the respective process (operation 190, FIG. 6); either adopting the proposed name (if the original request was a Name Check) or abandoning the session establishment effort (if the request was a Call Name Check). The actions taken in respect to interruptions other than those discussed above are not relevant to the present invention, and therefore are not shown or discussed.

6. BRIDGE DATAGRAM HANDLING

The handling of bridge type datagrams at bridging and non-bridging nodes is indicated in FIG. 7. Non-bridging nodes originate such datagrams for one of two purposes; to request initialization, or to extend a name checking process across bridges interfacing to associated primitive networks. Bridging nodes originate bridge datagrams to communicate with other bridging nodes; either to extend name checking requests to networks further removed from a non-bridging request originator, or to exchange other information (e.g., information relating to changes in network topology).

Initialization requests from non-bridging nodes are instigated by respective processors at "start-up" times (presently meaning times when respective nodes are first actively coupled to the network, or re-coupled after having been taken down to correct associated system failures). The information for such request, which is preset in the system's memory, is retrieved by the system (200, FIG. 7) and encapsulated in a bridge datagram (201, FIG. 7; see FIG. 4 for the datagram form). The datagram is broadcast over the associated primitive network (202, FIG. 7). As explained previously, only processors at bridges respond to such requests and do so by returning acknowledging signals containing delay factor information. The formation of such responses is discussed later under "setting of node timeouts". As noted previously, the longest delay factor is selected by the request originator as its process timeout function.

Bridge datagrams to extend name checking from non-bridging to bridging nodes are formed in the manner illustrated at 204-206 (FIG. 7). When the processor at a node originating a name checking request detects the limit of its primitive retry action, without having received an acknowledgement of its associated communications (operations 204), it retrieves the related information (205) and forms the datagram (206). Corresponding signals are placed on the directly accessible communication medium (operation 207) to communicate the information to bridges linked to that medium. The bridges extend the respective name checking communication by actions discussed later. A bridge receiving one or more acknowledgements of its extended communications passes the first such back to the originating processor through the network. Each bridge monitors its media on both "sides" (including the medium directly linked to the datagram origin), and the bridges thereby cooperate to ensure that no more than a single acknowledgement of such a datagram returns to the originating node (from all of the bridges primitively linked to that node).

The processing facility which originated the datagram is eventually interrupted (208) by a condition related to that communication; either a returning acknowledgement (209) or a local process timeout condition (210). When this occurs, the associated name checking process is concluded. If that process was for unique name adoption, and the datagram was acknowledged, "in use" status is posted to the associated process program. If the process was for session establishment, and was acknowledged, information indicating a "good response" and identifying the first acknowledging node is posted to the associated program. If the process timeout expired without acknowledgement, and the process related to name adoption, "good status" is posted to the associated program which causes the name to be adopted (entered into the local name table in association with the respective local entity). If the timeout expired for a datagram containing a Call Name Check, "unsuccessful" status is posted indicating to the associated program that the name of the entity sought to be contacted is not recognizable within the network.

When a bridging node receives a datagram (220, FIG. 7), its processor inspects the type field (221) to distinguish between datagrams directed to bridges and other datagrams (refer to the referenced "Non-Unique" application for descriptions of other datagram forms and their usage). Datagrams not directed to bridges are not relevant to the present discussion. On recognizing a "bridge" type datagram, the respective bridge processor inspects the datagram origin (222, FIG. 7), since different handling is required for bridge datagrams received from bridging nodes and non-bridging nodes. If the datagram source is a non-bridging node, the form of the datagram information is inspected (223, FIG. 7) to distinguish between requests for initialization and datagrams requesting extension of name checking operations. If such a datagram contains a request for initialization, the bridge processor consults its table (see discussion of FIG. 8 below), and returns a related delay factor to the request origin (224, FIG. 7).

If a datagram originated by a non-bridging node contains a name checking request, the bridge processor extracts a hop count factor from its associated table (225, FIG. 7), and initiates the process for extending that request to network paths spanned by the respective bridge. The extracted hop count is a value designed to extend the range of the name checking request through networks spanned by other bridges, and out to a medium furthest removed from the original requesting node, but restricted so that the request can not circulate through another bridge forming a looping path back to the originating node. A bridge receiving a name checking datagram from a preceding bridge initiates the same extension process, but with a hop count value contained in the received datagram (226, FIG. 7).

The process performed by a bridge for extending a name checking request to a respectively spanned medium (226-241, FIG. 7) includes: decrementing the hop count (226), either the count set at 225 or the count contained in a datagram received from a preceding bridge; starting primitive and process timeouts related to the path beyond the bridge (227); broadcasting the name checking message contained in the received datagram over the spanned medium (228); and incrementing a retry count (229). The primitive timeout set at 227 is a function of the longest handling and response delays anticipated relative to the primitive path beyond the bridge, and the process timeout is a function of the longest delays anticipated over the full hop count range of the path beyond the bridge (including successive bridges and media).

The extension process yields either one or more acknowledgements (230-233) or actions evoked by timeout interruptions (234-241).

If an acknowledgement is received (230) an acknowledgement count is incremented (231). The first received acknowledgement is passed back, along the path from which the related datagram was received (232), either to a preceding bridge or the node which originated the request (whichever is directly accessible from the node handling the acknowledgement). If more than one acknowledgement is received during one timeout period, a conflict signal is transmitted (233) towards the sources of acknowledgement. The foregoing statement applies only to acknowledgements received from the side of the bridge which is remote from the source of the respective datagram. However, in the primitive network serving a non-bridging node which originates a name check datagram, each bridge should be adapted to recognize an acknowledgement of the datagram transferred from another bridge to the medium which links directly to the originating node, and increment its acknowledgement count in response to that acknowledgement. This would lessen signal traffic in the primitive network, since only the first acknowledgement of a datagram would be relayed through bridges, even if acknowledgements are received at plural bridges. Furthermore, it would simplify the handling of signal transmissions indicating conflicting name usage since each bridge would be responsible for sending such signals to the respective path extending beyond the primitive network, and would do so even if it received only one acknowledgement from the respective path when another bridge transferred an earlier acknowledgement to the primitive path.

If the primitive timeout ends without acknowledgement (234, FIG. 7) and the retry limit has not been exhausted, the primitive timeout is restarted (235, FIG. 7) and operations 228 and 229 are repeated. If the retry count reaches the limit (recognized at 236, FIG. 7) the action taken next is conditioned (237) on the value of the hop count as decremented at 226. If the value is other than 0, the bridge forms a datagram containing the decremented hop count (but corresponding otherwise to the datagram received at 220), and transmits that datagram to the path directed away from the request originator (action 238, FIG. 7). That transmission is followed either by receipt of acknowledgement (230) or expiration of the respective process timeout (240). If the process timeout expires, or the hop count value inspected at stage 237 is 0, the handling of the datagram communication process at the respective bridge is concluded (241). At such conclusion (no acknowledgements after full term handling), the bridge takes no further action relative to the network.

7. SETTING OF NODE TIMEOUTS

Figure 8:
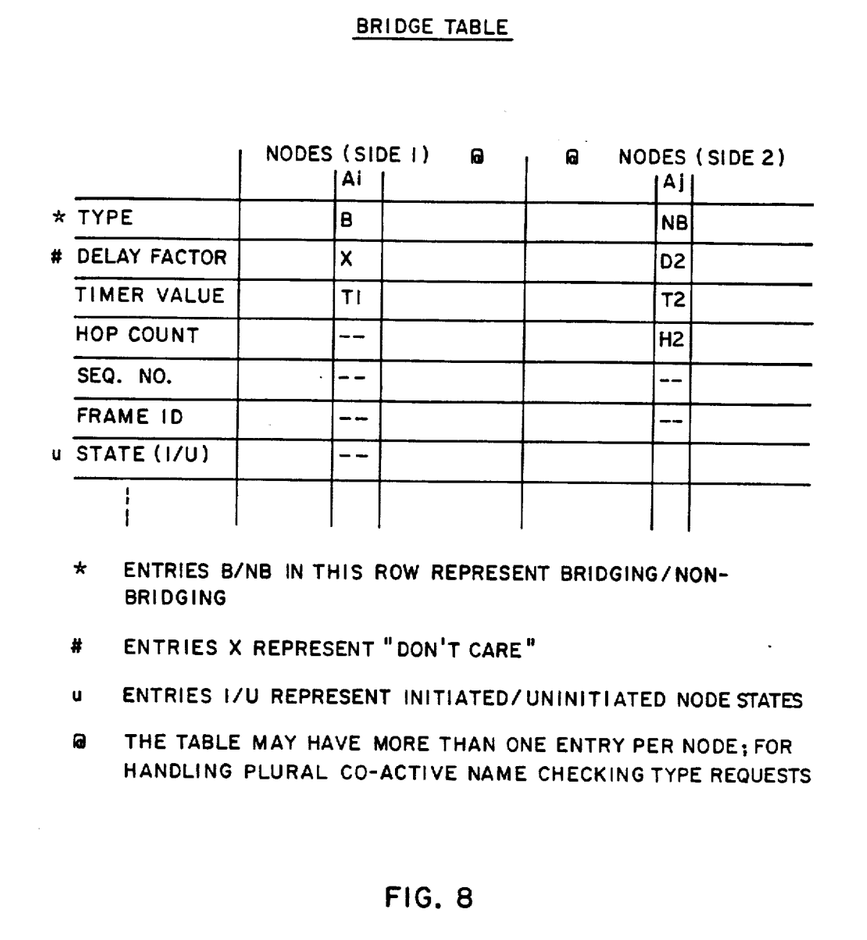
FIG. 8 is a table illustrating the information used by bridging facilities in respect to establishing the timeout parameters of foregoing communication processes.

Each bridge maintains a table having the form suggested in FIG. 8, for responding to requests for initialization from non-bridging nodes (see 223, 224, FIG. 7). The table reflects the topology of the network on both sides of the respective bridge (sides "1" and "2"). The entires in the table rows are established when the bridge is first introduced into the network (e.g., through information keyed into the bridge processing facility by a technician responsible for setting up the bridge attachment).

The table columns indicate the parameters associated with the nodes directly linked to each side of the respective bridge. There is at least one column of entries for each node address (addresses Ai and Aj are illustrated as representative), and columns may be provided for bridging nodes (type B) as well as non-bridging nodes (type NB). As indicated in the footnotes to FIG. 8, there may be more than one column of entries for a node having plural co-active requests. The columns associated with bridging nodes can be used to enable the respective bridge to ascertain the hop count topology extending beyond another bridge primitively linked to the respective bridge.

The delay factor for bridging type nodes is "X" ("don't care"). The delay factor for non-bridging nodes is a constant; "D1" for nodes accessed through side 1 and "D2" for nodes accessed through side 2. The value of the constant is a function of the network topology extending beyond the opposite side of the bridge. Thus, D1 is a function of the topology viewed at side 2 and D2 is a function of the topology viewed at side 1. The timer values are the values used at the respective bridge for setting its datagram handling timeouts relative to the nodes designated in each column. The hop count values are the values used for initializing hop count functions relative to name checking datagrams received from associated non-bridging nodes (see 225, FIG. 7). The sequence number and frame identity (ID) terms are set in accordance with information in name checking datagrams currently being processed, and permit the bridge to associate acknowledgements with respective request origins. The state information distinguishes between initiated and uninitiated node states, allowing the bridge to reject name checking datagram requests erroneously issued by uninitiated nodes.

8. CONCLUSION

We have described above a method for extending name checking communications, which are originated independently by "peer" processors across bridging interfaces between primitive portions of a complex network. Such extensions are handled without ambiguity, and with minimal burdening of the originating processors, by processors located at the bridging interfaces. This tends to lessen the traffic burden on the network (since acknowledgements of an extended name checking communication, other than the first acknowledgement, are "trapped" at the first bridge sensing such acknowledgements), as well as the processing burdens imposed on the non-bridging processors.

The foregoing techniques can be modified in several ways without departing from what we presently consider to be our invention.

For example, the function achieved by setting the hop count at the first bridge in the extension path of a name checking request could also be realized by requiring each bridge to compare identities of newly received name checking datagrams with identities of datagrams currently being timed out. Thus, if an extension process transferred across several bridges enters a bridge completing a looping path, the latter bridge would detect conflict with a datagram transferred earlier in the opposite direction, and supress (ignore) the newly received datagram.

Furthermore, the extended communication effect achieved by means of bridge datagrams could be realized (less efficiently, but possibly more reliably) by means of point-to-point communications. Instead of sending a datagram, a node originating a name checking process could establish individual sessions with each bridge linked to its primitive network, and transfer the information to be handled across each bridge in a session communication (see the referenced "Distributed Control" application for the form of such communications). Each bridge could do the same for communicating with the next further level of bridges relative to a name checking process. Furthermore, the timeout initialization process could also be conducted by means of separate session communications between a non-bridging node and each primitively coupled bridging node.

Accordingly, while the invention has been described with reference to a particular embodiment, it will be understood by those skilled in the art that various modifications in form and detail may be made without departing from the spirit and scope of the invention.

What is claimed is:

1. In a data communication network having plural sub-networks linked by bridging facilities, each sub-network linking plural data processing stations for exchanging messages containing information entities stored in record files at said stations, said stations being adapted to initiate communications representing requests for access to remotely stored entitles by means of messages directed to logical names assigned to the entities rather than to addresses representing specific physical locations at which respective entities are stored, said messages not requiring special handling at stations intermediate the originating stations and the stations at which respective entities are filed for translating respective names to addresses, a method for facilitating handling of said request communications comprising:

at any one of said stations, originating a first said request and transmitting said request as a first communication message over a first sub-network to which said station is directly linked; said first message containing a logical name of a record file entity not stored at said one station and having a predetermined first form which restricts its handling so that the information therein is not transferrable beyond bridging facilities directly linked to said first network to other sub-networks;

monitoring said first sub-network at said one station for response communication messages representing responses to said first message;

if no response to said first message is received at said one station, transmitting a second request message from said one station over said first sub-network; said second request message corresponding to said first request message but having a predetermined second form different from said first form; said second form permitting responsive handling of the information contained in said message only at bridging facilities directly coupled to said first sub-network;

monitoring said first sub-network at said one station for responses to said second message;

at each bridging facility receiving said second message, generating a third message conditionally depending on the information content of said second message, said third message corresponding to the second message but having a distinctive third predetermined form;

transmitting said third messages from respective bridging facilities to other sub-networks which are linked by respective facilities to said first sub-network;

monitoring said other sub-networks at respective facilities for responses to respectively forwarded third messages; and forwarding responses to said third messages directly to said one station via said first sub-network, for handling as responses to said second message.

2. The method of facilitating request communications in accordance with claim 1 wherein:

said monitoring for responses to said first message of said one station is timed for a predetermined first timeout interval;

the activities at said one station relative to said first and second messages, including the monitoring for responses to said second message, are timed by a second predetermined timeout interval; and the monitoring for responses to said third messages at said bridging facilities is timed for a predetermined third timeout interval which may be different at different said facilities.

3. The method according to claim 2 wherein said second timeout interval is established at the initial powering up of said one station and thereafter maintained by the station.

4. The method according to claim 3 wherein the second timeout interval is established via initial communications between said one station and bridging facilities coupled to said first medium or channel and determined by information furnished by said facilities in said communications.

5. The method according to claim 4 wherein;

said facilities act in said initial communications to furnish delay factor information representing longest delays in request and response handling relative to portions of the network spanned by respective facilities; and the value chosen for timing said second timeout interval is the largest of the values furnished by said facilities.

6. The method according to claim 2 wherein:

said first message is a message of either a first or second type, both types being used for different purposes but having a common effect of providing indication to said one station of whether or not a name contained in the message is associated with an entity remote from said one station.

7. The method of claim 6 wherein:

messages of said first type are Name Check messages used for the purpose of enabling the originating one station to determine if a name which that station is seeking to adopt for a locally served entity is currently in use at a remote station; and messages of said second type are Call Name Check messages sent for the purpose of initiating a communication session between a local entity served by the originating one station and a remote entity having a name contained in the respective message.

8. The method according to claim 2 wherein at least one of said bridging facilities coupled to said first medium or channel spans a medium linking to a further bridging facility, and wherein:

said third timeout value employed at said at least one bridging facility is determined by:

selecting a value sufficient to allow for request and response communication through said further facility and to stations linked by said further facility.

9. In a data communication network having nodes to which data processing stations are linked for exchanging information, said network consisting of plural media and/or channels linked via bridging facilities, each medium or channel being capable of coupling to and sustaining communications between multiple data processing stations, each station being capable of serving a plurality of locally attached entities and of sustaining communications between said entities and remote stations by means of logical names adopted by said stations individually, i.e. by means of name checking and response communications carried out between said stations through said network, a method of facilitating the handling of said communications in said network comprising:

at any one of said stations, selecting a tentative logical name for association with a respectively served entity and proceeding to verify exclusivity of said name by successively:

A. broadcasting a first Name Check message, one or more times, over a first medium or channel to which said one station is directly coupled, for attention only by stations or facilities directly coupled to said first medium or channel and designed to have no effect relative to stations coupled to said network through other media or channels;

B. monitoring said first medium or channel for a predetermined first timeout period for responses to said first message;

C. if a response is received during said period, rejecting adoption of said tentative name and discontinuing efforts to adopt same;

D. if no response is received during said period, transmitting a second Name Check message from said one station, over said first medium or channel, for attention only by bridging facilities coupled directly to said first medium or channel;

E. monitoring said first medium or channel at said one station for a predetermined second timeout period for responses to said second Name Check message;

F. translating said second message through said bridging facilities to third messages and transmitting said third messages to other media or channels linked via said bridging facilities to said first medium or channel;

G. monitoring said other media or channels at said bridging facilities for predetermined third timeout periods and forwarding responses to said third messages received during said third periods to said one station via said first medium or channel; said responses appearing to said one station as responses to its second message; said third periods having durations not exceeding the duration of said second period;

H. if said one station receives a response to said second message during said second period, rejecting said name and discontinuing efforts to adopt same; and I. if said one station receives only one response to said second message, adopting said name and thereafter sustaining an association between the name and the respective entity at said one station.

10. In a data communication network having plural subnetworks linked by bridging facilities, each subnetwork consisting of a single time or frequency channel on a single communication medium linking plural data processing stations, different subnetworks within said network having either physically separate linking media or separate linking channels on a common medium, said subnetworks being linked for communication through bridging facilities permitting communications to be carried between stations linked to said network through separate media or channels, said stations being adapted to share access to entities variously dispersed throughout the network and to initiate access to such entities by means of communications containing logical names adopted for association with such entities, said logical names being unrelated to locations of respective entities in said network, the method for facilitating name adoption communications in such networks comprising:

at any one of said stations selecting a tentative name for association with an entity attached to that station, and then proceeding to verify the status of use of that name in said network by successively A. broadcasting a Name Check message over a first medium or channel to which said one staton is directly linked; said message having a first form preventing bridging facilities linked to said first medium or channel from forwarding information in the message to other media or channels in said network;

B. monitoring said first medium or channel for a first predetermined timeout interval for responses to said message;

C. conditional on receiving no response to said message within said first interval, transmitting a second Name Check message corresponding to said first message over said first medium or channel; said second message having a second form causing said bridging facilities to process the information therein and to selectively forward said information in a third form to other media or channels; facilities forwarding information in said third form monitoring respective other media or channels for predetermined third timeout intervals unique to respective facilities and forwarding responses to said third form messages to the one medium or channel as responses to said second message;

D. monitoring said first medium or channel for a predetermined third timeout interval at said one station for responses to said second Name Check message; and E. conditional on responses to said first and second messages recognized at said one station, either adopting or rejecting said name.

11. In a data communication network having nodes to which data processing stations are linked for exchanging information, said network consisting of plural media and/or channels linked via bridging facilities, each medium or channel being capable of coupling to and sustaining communications between multiple data processing stations, each station being capable of serving a plurality of locally attached entities and of sustaining communications between said entities and remote stations by means of logical names adopted by said stations individually, i.e., communications directly between said stations through said network, a method of facilitating the establishment of communications between pairs of said entities located at different stations comprising:

at a station serving one entity of a pair, broadcasting a first Call Name Check message broadcast, over a first medium or channel to which that station is directly coupled; said first message having a form restricting handling of the information therein to stations directly coupled to said first medium, said information including the name of a called entity;

at any other station directly coupled to said first medium, transmitting a response to said first Call Name Check broadcast if said called name in said message corresponds to a name adopted for an entity at said other station;

monitoring said first medium, at the station serving said one entity, for responses to said message;

if a response is detected, analyzing the response and conditionally initiating further communications with the responding station to establish a session with an entity at the responding station;

if no response is detected, originating a second Call Name Check transmission from the station which sent the first Call Name Check; said second Call Name Check having a form restricting direct handling of its information to bridging facilities directly coupled to said first medium or channel;

monitoring said medium or channel for responses to said second Call Name Check;

at each bridging facility receiving said second Call Name Check selectively generating a corresponding third Call Name Check message and transmitting that message to a further medium or channel which is linked by the respective facility to the first medium or channel;

at any station coupled to a said further medium or channel transmitting a response to said third message if that message names an entity served by the respective station;

monitoring said further media or channels at respective facilities for responses to said respective third messages;

forwarding responses to said third messages to said one medium or channel as responses to said second message; and conditional on responses to said second Call Name Check received by the station originating that message, initiating other communications directed to a responding station to establish a session between the one entity served by the originating station and an entity served by the responding station.

12. A method for establishing a communication session in accordance with claim 1 comprising:

at each said bridging facility receiving said second Call Name Check message, making a selective determination of whether or not to forward the information in that message on the basis of the information in the message and information stored at the respective facility; and conditionally forwarding the information in the message to respective said other media or channels on the basis of said determination.

13. The method of claim 11 including:

at each said bridging facility making a determination to forward the information in said received second Call Name Check message, adding control information to the forwarded message information for restricting the number of subsequent bridging facilities through which the forwarded information may be passed.

14. The method of claim 11 including:

conditioning each of said stations at power on time to engage in initial communications with bridging facilities coupled to media or channels to which the stations are directly coupled, for establishing timeout parameters under the direction of said facilities for determining the time periods to be allowed at respective stations for monitoring respective media or channels for responses to respective Call Name Check broadcasts thereafter originated by respective stations.

15. The method of claim 14 in which said conditioning step includes:

selecting timeout values at respectively coupled bridging facilities sufficient to allow respectively forwarded third Call Name Checks to reach and be processed by all stations within predetermined forwarding ranges of the respective facilities, and also sufficient to allow for responses from the stations within said ranges to be passed back to the station originating the respective second Call Name Check; and at each newly powered on station receiving more than one timeout value, selecting and thereafter using the largest such value.

16. The method of claim 15 wherein each bridging facility sustains a timeout for each respectively forwarded Check message, using said largest value, said timeout restricting said response monitoring operations.

* * * * *